United States Patent

[11] 3,557,665

| [72] | Inventor | Alexander Von Lowis |
| | | Mauren, Germany |
| [21] | Appl. No. | 836,119 |
| [22] | Filed | June 24, 1969 |
| [45] | Patented | Jan. 26, 1971 |
| [73] | Assignee | Robert Bosch, G.m.b.H. |
| | | Stutgart, Germany |
| [32] | Priority | July 13, 1968 |
| [33] | | Germany |
| [31] | | 1,755,945 |

[54] BRAKING CYLINDER FOR VEHICLES, ESPECIALLY AUTOMOTIVE VEHICLES
13 Claims, 3 Drawing Figs.

[52] U.S. Cl............................................... 92/13,
92/24, 92/60, 188/170
[51] Int. Cl............................................... F15b 15/26
[50] Field of Search........................................ 92/24, 27,
28, 13, 60; 188/170, 67

[56] References Cited
UNITED STATES PATENTS

| 2,632,425 | 3/1953 | Grover | 92/28 |
| 3,350,987 | 11/1967 | Johnson | 92/27X |
| 3,353,455 | 11/1967 | Berry | 92/27X |
| 3,429,233 | 2/1969 | Wright | 92/27X |
| 3,450,008 | 6/1969 | Fites | 92/24 |

Primary Examiner—Martin P. Schwadron
Assistant Examiner—Leslie J. Payne
Attorney—Michael S. Striker ABSTRACT: A braking arrangement for vehicles in which a braking piston with a piston rod is reciprocably arranged in a braking cylinder and defines with an end wall of the latter a working space into which pressure fluid may be fed to move the braking piston in a first direction for actuating a brake connected thereto, and in which an annular blocking piston which sealingly engages the inner cylindrical surface of the braking cylinder and the outer surface of the piston rod is arranged between said braking piston and the other endwall of the cylinder. The blocking piston defines in the interior of the cylinder a counterpressure space and moves relative to the braking piston upon feeding of pressure fluid into the counterpressure space. Clamping elements carried by the blocking piston are pressed, during initial feeding of pressure fluid into the counterpressure space and resulting movement of the blocking piston relative to the braking piston, against one of the aforementioned surfaces to thereby hold the blocking piston stationarily with respect to the one surface to cause upon further feeding of pressure fluid into the counterpressure space movement of the braking piston in a direction opposite to the first direction.

INVENTOR
Alexander von LÖWIS
By *Ot Thener*

*Michael J. Striker*
his ATTORNEY 3,557,665

BRAKING CYLINDER FOR VEHICLES, ESPECIALLY AUTOMOTIVE VEHICLES

BACKGROUND OF THE INVENTION

The present invention relates to a braking cylinder for vehicles, especially automotive vehicles, with a first, pressure fluid actuated piston for actuating the brakes of the vehicles and a second piston which is effective upon actuation of a wheel blocking indicating device.

Braking cylinder arrangements of the aforementioned type are known in the art in which the two piston members are constituted by two different faces of a piston which are subjected to opposite pressures.

In this known arrangement liquid is used as a pressure fluid and this liquid fills completely the braking cylinder. In such an arrangement every pressure change in the cylinder to one or the other side of the piston therein will instantaneously act on the piston and therewith onto the brake since the pressure in a liquid is propagated without delay. In hydraulic brakes of the aforementioned type it is therefore possible to release a blocked brake easily and without any delay.

Such an arrangement is however not suitable for braking cylinders which are actuated by compressed air since with compressed air a certain time is necessary to build up a desired pressure in the cylinder.

In such an arrangement in which the volume of the counterpressure space will depend on the position of the braking piston, different filling and actuating times would be unavoidable. This in turn would result in different braking and releasing intervals according to the position of the piston in the braking cylinder, depending on the wear of the brake lining of the brake and the brake adjustment. In an arrangement for releasing the brake in its blocked position, it is however desired to carry out a quick change of the brake from the braking to the releasing position.

SUMMARY OF THE INVENTION

It is an object of the present invention to provide a braking arrangement of the aforementioned kind in which in any position of the braking piston a quick change from the braking to the releasing position can be carried out.

It is a further object of the present invention to provide for an arrangement of the aforementioned kind which is composed of relatively few and simple parts so that the arrangement may be manufactured at reasonable cost and will stand up properly under extended use.

With these and other objects in view, the braking arrangement according to the present invention for vehicles, especially automotive vehicles, comprises a braking cylinder having a peripheral wall having an inner cylindrical surface and a first and second transverse wall, a braking piston reciprocable in the braking cylinder and having a transverse wall and a piston rod having an outer cylindrical surface radially inwardly spaced from the inner cylindrical surface of the cylinder. The braking piston defines between its transverse wall and the first transverse wall of the cylinder a working space in the interior of the cylinder. The arrangement includes further means connecting the braking piston to a brake of the vehicle, first passage means for feeding pressure fluid into the working space for moving the braking piston in a first direction to actuate the brake, an annular blocking piston sealingly engaging the aforementioned cylindrical surfaces and defining between the latter and one of the transverse walls a counterpressure space, and second passage means for feeding pressure fluid into the aforementioned counterpressure space so as to move said blocking piston relative to the braking piston. Clamping means are carried by the blocking piston and cooperate with the latter to translate axial movement of the blocking piston relative to the braking piston during initial feeding of pressure fluid into the aforementioned counterpressure space into radial movement of clamping elements of the clamping means to press the clamping elements against one of the cylindrical surfaces with a frictional force which is greater than the axial force imparted to the blocking piston by feeding pressure fluid into the counterpressure space to thereby move, during further feeding of pressure fluid into the last-mentioned space, the braking piston in a direction opposite to the first direction.

The novel features which are considered as characteristic of the invention are set forth in particular in the appended claims. The improved transporting apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
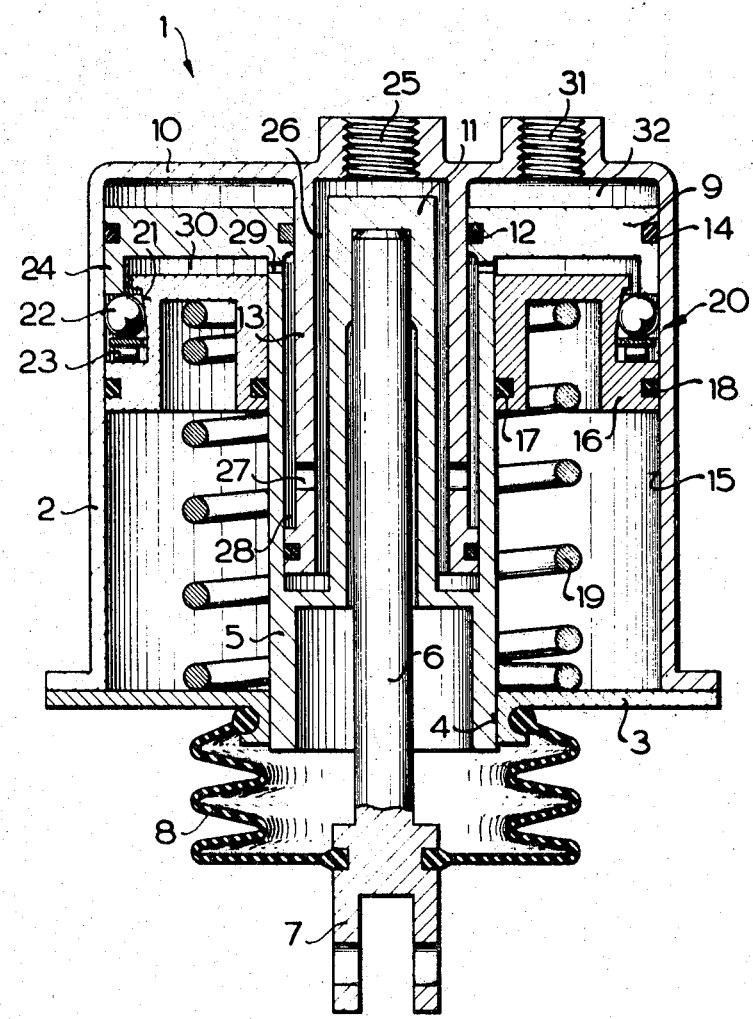
FIG. 1 is an axial cross section through a first embodiment of a braking arrangement according to the present invention in which the clamping means cooperate with the inner cylindrical surface of the braking cylinder.

The embodiment shown in FIG. 1 in axial cross section comprises a braking cylinder 20 having a cylindrical wall 2 with an inner cylindrical surface 15 and a pair of transverse walls, that is the wall 10 integrally formed with the cylindrical wall and the cover 3 connected thereto in any convenient manner. A braking piston 9 is reciprocably arranged in the cylinder 2 and the braking piston 9 is integrally formed with a tubular piston rod 5 which slidably extends in a sealed manner through a central opening 4 in the cover 3. A solid piston rod 6 is centrally located in the tubular piston rod 5 and extends in axial direction beyond the latter. The outer end 7 of the piston rod 6 which is adapted to be connected in a known manner, not shown in the drawing, to a wheel brake is also connected with the cover 3 by a rubber bellows 8 which serves to prevent dust or similar impurities to enter into the hollow piston rod.

A tubular or pot-shaped insert 11 is provided in the interior of the tubular piston rod 5 and the lower end of the insert 11 is integrally connected to the wall of the tubular piston rod 5. The rear end of the solid piston rod 6 is received in the interior of the insert 11 and abuts against the closed end of the pot-shaped insert 11. The braking piston 9 is in form of an annular piston which engages with a sealing ring 12 a tubular projection 13 integrally connected with the bottom 10 of the cylinder 2 and projecting coaxially with the peripheral wall of the cylinder from the bottom 10. A sealing ring 14, provided at the outer periphery of the piston 9, fluid tightly engages the inner surface 15 of the peripheral wall of the cylinder 2. The piston 9 is located in the brake release position, shown in FIG. 1, closely adjacent to the bottom 10 of the cylinder 2. An annular blocking piston 16 is located between the transverse wall of the piston 9 and the cover 3 of the cylinder. The blocking piston fluid tightly engages with a sealing ring 17 the outer surface of the tubular piston rod 5 and with another sealing ring 18 the inner surface 15 of the peripheral wall of the cylinder 2. A compression spring 19 engaging with opposite ends the cover 3 and the blocking piston 16 biases the latter in direction towards the braking piston 9.

Clamping means 20 are carried by and cooperate with the blocking piston 16 in a manner as will be described in detail later on, and these clamping means comprise a plurality of clamping elements, preferably in the form of balls 22 uniformly distributed about the circumference of a frustoconical surface 21 provided on the blocking piston 16 and tapering in direction toward the cover 3 and a corrugated leaf spring ring 23 which has a spring force smaller than the force exerted by the compression spring 19 and which biases the balls 22 against the end face of an annular projection 24 provided on the braking piston 9.

A central inlet opening 25 in the bottom 10 of the cylinder serves to connect a source of compressed air thereto so that compressed air may be fed into the space 26 defined in the interior of the tubular projection 13. The space 26 communicates through a plurality of radial openings 27 with the annular space 28 defined between the tubular projection 13 and the inner surface of the tubular piston rod 5, and the space 28 communicates in turn through a plurality of radially extending passages 29 with a counterpressure space 30 defined between the braking piston 9 and the blocking piston 16.

The above-described brake cylinder arrangement 1 will operate as follows:

In the release position of the brake, the various elements of the brake cylinder arrangement will assume the position as shown in FIG. 1. In this position, the balls 22 are pressed by the annular spring 23 and the frustoconical surface 21 against the inner surface 15 of the braking cylinder. During normal braking action compressed air is fed through the inlet 31 in the bottom of the cylinder into the working space 32 defined between the bottom 10 and the braking piston 9 so that the latter is moved in axial downward direction after a certain pressure has built up in the working space 32. During such movement of the braking piston 9, the annular projection 24 thereof will press the balls 22 in downward direction, against the force of the relatively weak spring 23 so that the balls 22 will move toward the small diameter end of the frustoconical surface 21 and not exert any longer any radial pressure against the inner surface 15 of the cylinder. After the corrugated spring 23 is thus compressed, the pistons 9 and 16 will move simultaneously against the force of the compression spring 19 and the brakes connected to the piston rod 7 will be tightened. When during such tightening of the brake the vehicle rod becomes blocked, then compressed air is connected by means of a control member, not shown in the drawing and not forming part of the present invention, into the central inlet 25 and this compressed air fed into the space 26 passes through the openings 27, the space 28 and the passages 29 into the counterpressure space 30 to act on the one hand on the braking piston 9 in opposition to the working pressure in the working space 32 and on the other hand on the blocking piston 16 to move the latter away from the braking piston 9. During the movement of the two pistons away from each other the tubular projection 24 on the braking piston will become disengaged from the balls 22 so that the latter are free to move under the influence of the spring 23 towards the large diameter end of the frustoconical surface 21 to be, as the blocking piston 16 moves further away from the braking piston 9, forcibly pressed against the inner surface 15 of the peripheral wall of the cylinder. Thereby, the blocking piston 16 is held in fixed position relative to the cylinder 2 and during further feeding of compressed air in the counterpressure space 30, the braking piston 9 will be moved towards the bottom 10 of the cylinder that is in a direction opposite to the braking direction. The excessively applied brakes are thus released and the blocked wheel will become free. This cycle of braking and releasing may be repeated several times depending on the impulse of the control member which controls feeding of pressure fluid through the inlet 25.

Figure 2:
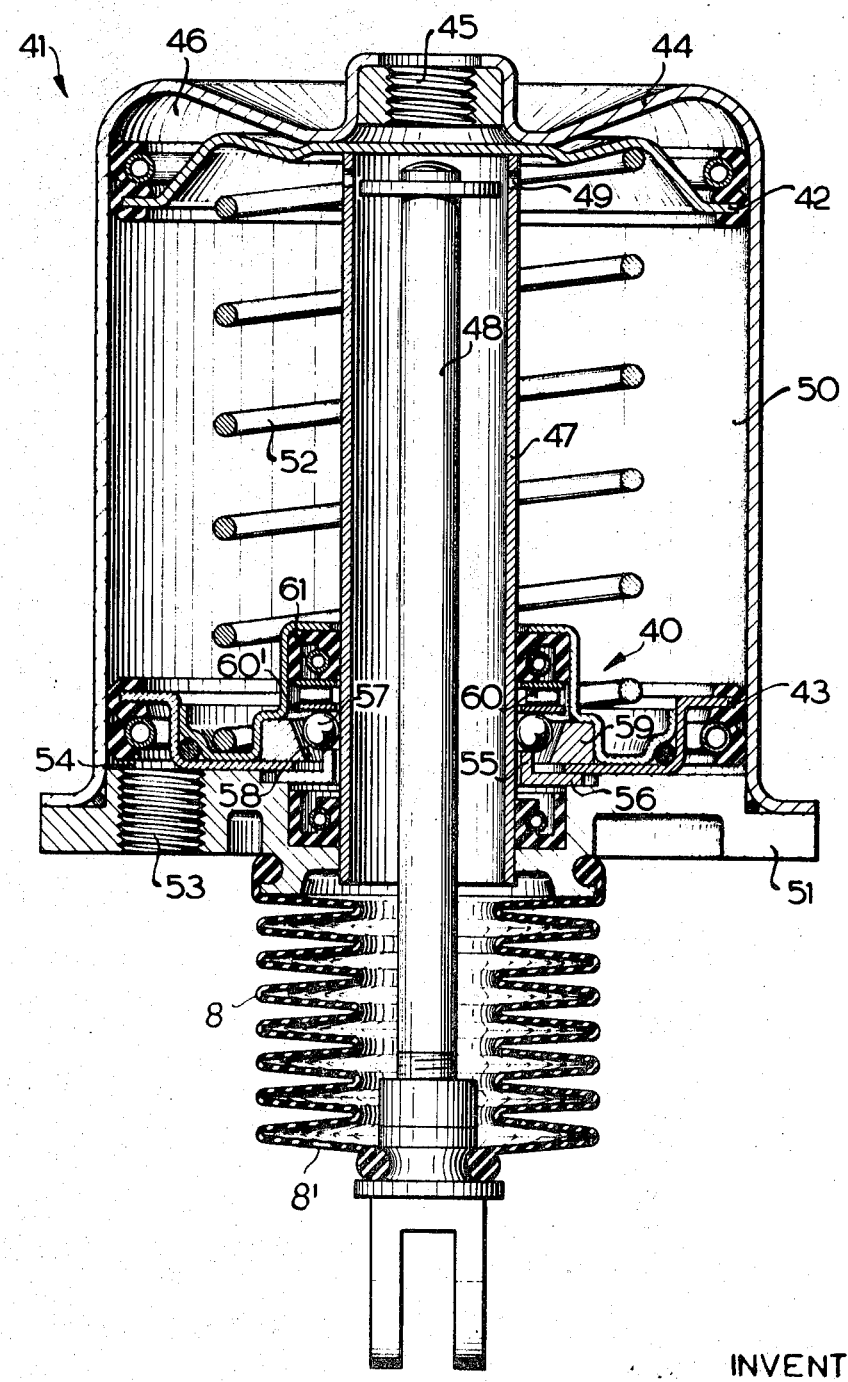
FIG. 2 is an axial cross section through a second embodiment in which the clamping means cooperate with the outer surface of the piston rod of the braking piston.

FIG. 2 illustrates a second embodiment of a brake cylinder arrangement 41 in which the clamping means 40 cooperate with the outer surface of the tubular piston rod 47 of the braking piston 42. Furthermore, while in the embodiment shown in FIG. 1 the braking piston 9 and the blocking piston 16 are arranged in the brake release position closely adjacent to each other, in the embodiment shown in FIG. 2 the braking piston 42 and the blocking piston 43 have in the brake release position, shown in FIG. 2, the largest distance from each other. The braking piston 42 fluid tightly engages the inner surface of the peripheral wall of the braking cylinder and defines with the bottom 44 of the latter a working space 46 into which compressed air may be fed through the central passage 45 formed in the bottom 44 so as to move the braking piston 42 in braking direction. A hollow piston rod 47 is fixedly connected in any convenient manner to the transverse wall of the braking piston and projects in axial direction from the latter through an opening in the cover 51 connected to the lower end of the braking cylinder 41. A piston rod 48 is centrally located in the tubular piston rod 47 and projects beyond the lower end of the latter. The lower end of the piston rod 48 is again connected to the brake, in a manner not shown in the drawing, and also through a rubber bellows 8 to the cover 51. The space 50 between the braking piston 42 and the blocking piston 43 communicates through a plurality of openings 49 formed in the upper end of the tubular piston rod 47 with the interior of the latter and through an opening 8' in the bellows 8 with outer atmosphere. A compression spring 52 between the braking piston 42 and the blocking piston 43 normally biases the latter into abutment with the cover 51. The cover 51 is formed with an inlet passage 53 for feeding, during blocking of the brake, compressed air into a counterpressure space 54 formed in the interior of the cylinder 41 between the blocking piston 43 and the cover 51.

The blocking piston 43 again carries clamping means 40 comprising a plurality of balls 57 uniformly displaced from each other about the outer surface of the tubular piston rod 47, and an annular member 59 coaxially mounted on the blocking piston 43 and having an inner frustoconical surface 58 tapering towards the cover 51 of the cylinder. A corrugated spring ring 60 abuts with one side thereof against an annular seal 61 carried by the blocking piston 43 and sealingly engaging the outer surface of the tubular piston rod 47, and at the other side against an annular member 60' resting on the balls 57 so that, in the position as shown in FIG. 2, the balls are resiliently pressed against a tubular projection 55 on a ring member 56 coaxially arranged with and abutting against the cover 51. In the position shown in FIG. 2, the balls 57 are therefore held in the region of the large-diameter end of the frustoconical surface 58 and are freely turnable.

The above-described arrangement will operate as follows:

In the starting or nonbraking position the various elements of the arrangement according to the present invention are in the position as shown in FIG. 2. The clamping elements or balls 57 are held by the tubular projection 55 of the ring 56 against the force of the spring ring 60 in the region of the large-diameter end of the frustoconical surface 58 so that the balls will not exert any clamping action against the outer surface of the tubular piston rod 47.

During desired braking action compressed air is fed through the central passage 45 into the working space 46 and moves thereby the braking piston 42 toward the cover 51 of the braking cylinder. Since no clamping action is exerted by the clamping means 40, the braking piston 42 and therewith the piston rod 48 will move freely in downward direction, or toward the cover 51, to thereby tighten the brakes in a known manner. If too great a braking force is exerted and the corresponding wheel of the vehicle is blocked, a control member of known construction and not shown in the drawing, which may include an inertia mass as feeler, will cause passage of compressed air through the passage 53 in the cover into the counterpressure space 54. This, in turn, will cause movement of the blocking piston 43 towards the braking piston 42 whereby the frustoconical surface 58 will engage the balls 57 and lift the same from the end face of the tubular projection 55 so that during further relative movement of the blocking piston, the balls will be tightly clamped against the outer surface of the tubular piston rod 47 and thereby lock the blocking piston 43 to the piston rod 47, so that during further feeding of compressed air into the counterpressure space 54, the blocking piston 43 and the braking piston 42 will be moved as a unit in the direction opposite to the braking direction. The braking force produced by the braking piston 42 will thereby be reduced until the corresponding vehicle wheel is not blocked any longer. During reduction of the air pressure in the counterpressure space 54, the blocking piston 43 will be returned towards its starting position as shown in FIG. 2 and the clamping means 40 will be released when the balls 57 abut against the end face of the projection 55 of the abutment ring 56. The cycle between braking and release may be repeated several times depending on the impulse of the control member which initiates feeding of compressed air into the counterpressure space 54.

Figure 3:
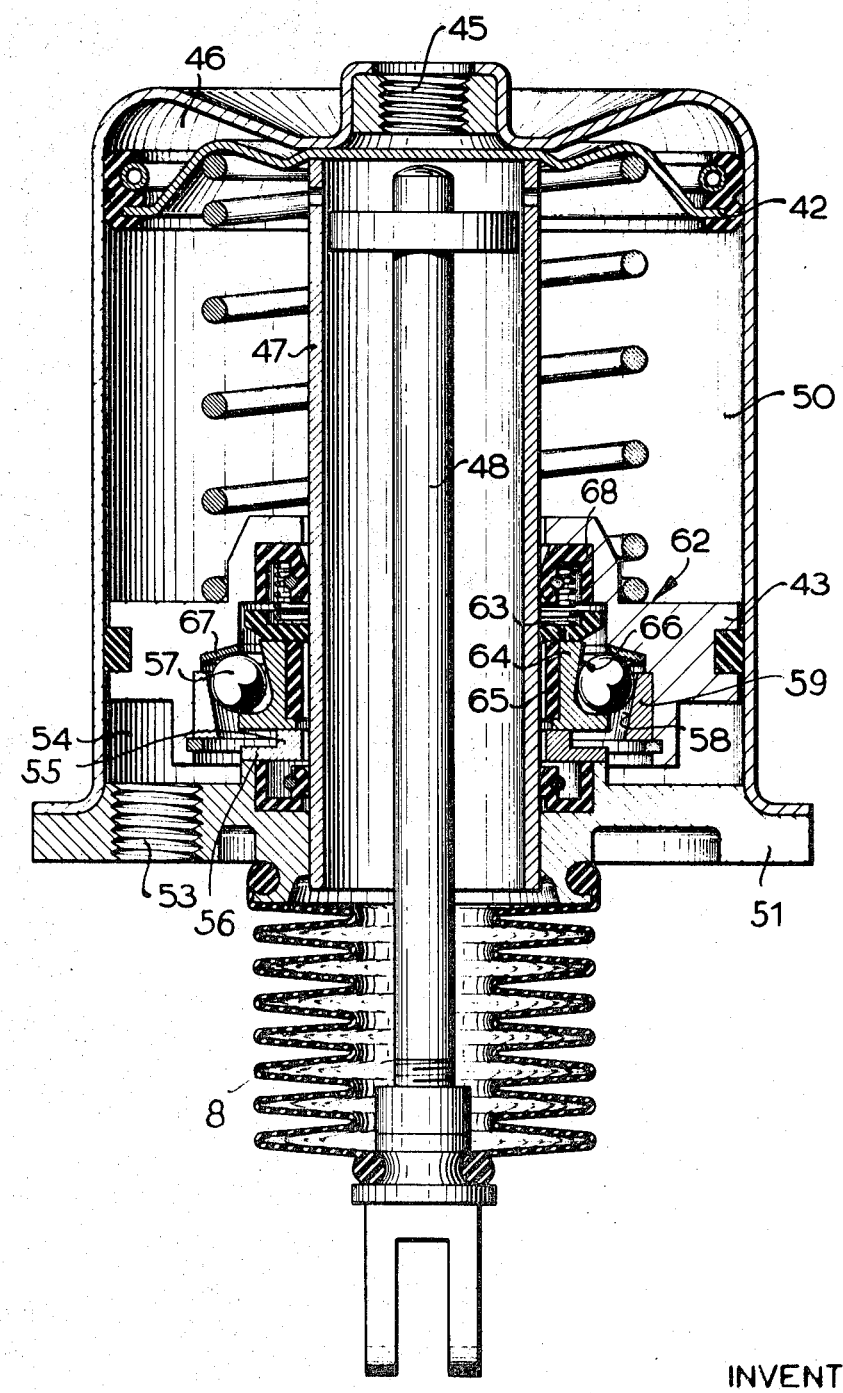
FIG. 3 is an axial cross section through a third embodiment in which the clamping means cooperate likewise with the outer surface of the piston rod of the braking cylinder.

FIG. 3 shows a further embodiment of a braking arrangement according to present invention in which the clamping means 62 provided on the blocking cylinder 43 are constructed in a similar manner as shown in FIG. 2. Elements of the arrangement as shown in FIG. 3 which are constructed in the same manner and which have the same function as the elements of the embodiment shown in FIG. 2 are designated in FIG. 3 with the same reference numerals and need therefore not be further described. The clamping elements or balls 57 of the clamping means 62 of the embodiment shown in FIG. 3 do however not directly engage the outer surface of the tubular piston rod 47, but friction and brake elements composed of a plurality of segments 63 and each comprising an outer metal segment 64 cooperating with the balls 57 and an inner friction lining 65 connected to the metal segment and cooperating with the outer surface of the tubular piston rod 47 are sandwiched between the latter and the balls 57. To improve the clamping action of the balls 57, the metal segments 64 form together an outer frustoconical surface 66 radially inwardly spaced from the frustoconical surface 58 provided on the member 59 fixed to the blocking piston 43. The segments 63 are pressed by a coil compression spring 68, in the position shown in FIG. 3, against the tubular projection 55 of an abutment ring 56 fixed to the cover 51 of the cylinder. In the starting position shown in FIG. 3 the balls are thereby held in a position in which they are freely rotatable and in which they will not exert any clamping action. A ring 67 of plastic material or rubber engages the balls and this ring serves to suppress noise during operation of the clamping means.

The arrangement illustrated in FIG. 3 will operate substantially in the same manner as described above in connection with FIG. 2, that is when during blocking of the wheels during excessive braking action, compressed air is fed through the inlet passage 53 into the counterpressure space 54, the blocking piston 43 will be moved toward the braking piston 42, whereby the elements 63 will be disengaged from the abutment 55 and the spring 68 will move the elements 63 in downward direction, as viewed in FIG. 3, so that the balls will engage the large-diameter ends of the frustoconical surfaces 58 and 66 to press, during further movement of the blocking piston 43, the segment 63 against the outer surface of the tubular piston rod 47 to thereby lock the blocking piston 43 in fixed position on the tubular piston rod 47, so that during further feeding of compressed air into the counter pressure space 54 the blocking piston 43 as well as the braking piston 42 will be moved as a unit in a direction opposite to the braking direction.

While the clamping elements 22 and 57 of the clamping means are shown in the various embodiments as balls, it is evident that other clamping elements such as rollers, sliding elements or the like, may be used in the described arrangements.

During return movement of the braking piston 9, respectively 42, to the position shown in the drawing, the piston rod 6, respectively 48, is likewise returned to the position shown under the action of a return spring of the brake connected thereto.

Without further analysis, the foregoing will so fully reveal the gist of the present invention that other can, by applying current knowledge, readily adapt it for various applications without omitting features which fairly constitute essential characteristics of the generic and specific aspects of my contribution to the art.

I claim:

1. In a braking arrangement for vehicles, especially automotive vehicles, a combination comprising a braking cylinder having a peripheral wall having an inner cylindrical surface and a first and second transverse wall; a braking piston reciprocable in said braking cylinder and having a transverse wall and a piston rod having an outer cylindrical surface radially inwardly spaced from said inner cylindrical surface of said cylinder, said braking piston defining between its transverse wall and said first transverse wall of said cylinder a working space in the interior of said cylinder; means for connecting said braking piston to a brake of the vehicle; first passage means for feeding pressure fluid into said working space for moving said braking piston in one direction to actuate said brake; an annular blocking piston reciprocable in said cylinder and sealingly engaging said cylindrical surfaces and defining between the latter and one of the transverse walls a counterpressure space; second passage means for feeding pressure fluid into said counterpressure space for moving said blocking piston relative to said brake piston; and clamping means including clamping elements carried by said blocking piston and cooperating with the latter to translate axial movement of the blocking piston relative to said braking piston during initial feeding of pressure fluid into said counterpressure space into radial movement of said clamping elements to press the latter against one of said cylindrical surfaces with a frictional force which is greater than the axial force imparted to the blocking piston by feeding pressure fluid into said counterpressure space to thereby move, during further feeding of pressure fluid into said counterpressure space, said braking piston in a direction opposite to said one direction.

2. A combination as defined in claim 1, wherein said clamping means comprising a member fixed to said blocking piston and having a frustoconical surface, said clamping elements being located between said frustoconical surface and said one cylindrical surface to be pressed against the latter during movement of said blocking piston relative to said braking piston during initial feeding of pressure fluid into said counterpressure space.

3. A combination as defined in claim 2, wherein said frustoconical surface faces the inner surface of the peripheral wall of said braking cylinder and wherein said clamping elements are located between said frustoconical surface and said inner cylindrical surface, said working space being defined between said first transverse wall of said cylinder and said transverse wall of the braking piston and said counterpressure space being defined between said blocking piston and said transverse wall of said braking piston.

4. A combination as defined in claim 3, and including biasing means tending to move said clamping elements in axial direction along said frustoconical surface from a nonclamping position to a clamping position, and an annular projection on said braking piston cooperating with said clamping elements to hold the latter against the force of said biasing means in said nonclamping position when said braking piston is adjacent said first transverse wall of said cylinder and during movement of said braking piston in said one direction away from said first transverse wall.

5. A combination as defined in claim 4, including spring means cooperating with said blocking piston for biasing the latter towards said first transverse wall of said braking cylinder.

6. A combination as defined in claim 2, wherein said frustoconical surface faces said outer cylindrical surface of said piston rod and wherein said clamping elements are located between said frustoconical surface and said cylindrical surface of said braking cylinder, said working space being defined between said first transverse wall of said braking cylinder and said transverse wall of said braking piston and said counterpressure space being defined between said blocking piston and said second transverse wall of said braking cylinder.

7. A combination as defined in claim 6, and including biasing means tending to move said clamping elements in axial direction along said frustoconical surface from a nonclamping to a clamping position and an annular projection on said second transverse wall of said braking cylinder and cooperating with said clamping elements for maintaining the latter in said nonclamping position when said braking cylinder in an initial nonbraking position and during movement of said braking cylinder in said one direction.

8. A combination as defined in claim 7, and including a compression spring between said transverse wall of said braking piston and said blocking piston for urging said pistons respectively against said first and said second transverse wall of said braking cylinder.

9. A combination as defined in claim 2, and including friction- and brake-elements sandwiched between said clamping elements and said one cylindrical surface.

10. A combination as defined in claim 9, wherein said friction- and brake-elements form together a second frustoconical surface radially spaced and facing said first-mentioned frustoconical surface.

11. A combination as defined in claim 7, and including friction- and brake-elements sandwiched between said clamping elements and said outer cylindrical surface of said piston rod, said friction- and brake-elements forming together a second frustoconical surface radially inwardly spaced from and facing said first-mentioned frustoconical surface and tapering in a direction opposite to the taper of said first frustoconical surface, and biasing means cooperating with said friction- and brake-elements for biasing the latter towards said annular projection on said second transverse wall.

12. A combination as defined in claim 2, wherein said clamping elements are balls.

13. A combination as defined in claim 12, and including a noise-reducing ring of plastic material engaging said balls.